US009875092B2

(12) United States Patent
Tervo et al.

(10) Patent No.: US 9,875,092 B2
(45) Date of Patent: Jan. 23, 2018

(54) VIRAL DISTRIBUTION OF MOBILE APPLICATION SOFTWARE

(71) Applicant: Mistral Mobile, Oulu (FI)

(72) Inventors: Timo P. Tervo, Oulu (FI); Binay Guragain, Oulu (FI)

(73) Assignee: Mistral Mobile, Oulu (FI)

( * ) Notice: Subject to any disclaimer, the term of this patent is extended or adjusted under 35 U.S.C. 154(b) by 0 days.

(21) Appl. No.: 14/255,423

(22) Filed: Apr. 17, 2014

(65) Prior Publication Data
US 2015/0301815 A1   Oct. 22, 2015

(51) Int. Cl.
G06F 9/45    (2006.01)
G06F 9/445   (2006.01)
G06Q 30/02   (2012.01)
H04M 1/725   (2006.01)

(52) U.S. Cl.
CPC ........... *G06F 8/61* (2013.01); *G06Q 30/0214* (2013.01); *H04M 1/72525* (2013.01)

(58) Field of Classification Search
CPC ... G06F 8/61; G06Q 30/0214; H04M 1/72525
See application file for complete search history.

(56) References Cited

U.S. PATENT DOCUMENTS

| | | | | |
|---|---|---|---|---|
| 6,496,979 B1* | 12/2002 | Chen | ........................ | G06F 8/61 717/178 |
| 6,941,270 B1* | 9/2005 | Hannula | .............. | G06Q 20/027 705/500 |
| 8,413,138 B2* | 4/2013 | Nath | ......................... | G06F 8/61 709/204 |
| 8,712,841 B1* | 4/2014 | Rajagopalan | ...... | G06Q 30/0214 705/14.16 |
| 8,832,681 B1* | 9/2014 | Cantrell | .................... | G06F 8/61 717/172 |
| 2002/0013155 A1* | 1/2002 | Jamthe | .............. | H04M 1/72522 455/517 |
| 2003/0110094 A1 | 6/2003 | Gulliver et al. | | |

(Continued)

OTHER PUBLICATIONS

Jung-Tae Kim et al., "Security Issues in Peer-to-Peer Systems", [Online], 2005, pp. 1059-1063, [Retrieved from Interent on Sep. 25, 2017], <http://ieeexplore.ieee.org/stamp/stamp.jsp?arnumber=1462966>.*

(Continued)

*Primary Examiner* — Ziaul A Chowdhury
(74) *Attorney, Agent, or Firm* — Mintz Levin Cohn Ferris Glovsky and Popeo, P.C.

(57) ABSTRACT

Methods and apparatus, including computer program products, are distribution of a mobile application. In one aspect there is provided a method. The method may include storing, at a first user equipment, a mobile payment application installation package; sending, by the first user equipment via a short-range radio link, an invitation to a second user equipment, the invitation representing an offer to receive the mobile payment application installation package; receiving, at the first user equipment, a response to the invitation; and sending, by the first user equipment via the short-range radio link, the mobile payment application installation package, when the response to the invitation represents an acceptance of the offer. Related apparatus, systems, methods, and articles are also described.

20 Claims, 9 Drawing Sheets

(56) References Cited

U.S. PATENT DOCUMENTS

| | | | |
|---|---|---|---|
| 2005/0272451 A1* | 12/2005 | Ho | H04M 1/72525 455/466 |
| 2006/0048141 A1 | 3/2006 | Persson et al. | |
| 2008/0057904 A1* | 3/2008 | Pousti | G06Q 30/06 455/406 |
| 2008/0229304 A1* | 9/2008 | Bengtsson | G06F 8/61 717/178 |
| 2009/0089177 A1* | 4/2009 | Dayton | G06Q 30/00 705/26.1 |
| 2010/0274678 A1* | 10/2010 | Rolf | G06Q 20/04 705/17 |
| 2010/0312817 A1* | 12/2010 | Steakley | G06F 8/61 709/202 |
| 2011/0111743 A1* | 5/2011 | Boukai | G06F 8/61 455/419 |
| 2011/0276961 A1* | 11/2011 | Johansson | G06F 8/61 717/178 |
| 2012/0110568 A1* | 5/2012 | Abel | G06F 8/61 717/178 |
| 2013/0298117 A1* | 11/2013 | Reynolds | G06F 8/68 717/173 |
| 2013/0305240 A1* | 11/2013 | Narendra | H04M 1/72525 717/176 |
| 2014/0007083 A1* | 1/2014 | Baldwin | H04L 65/1016 717/178 |
| 2014/0019957 A1* | 1/2014 | Wang | G06F 8/61 717/176 |
| 2014/0066015 A1* | 3/2014 | Aissi | H04W 12/06 455/411 |
| 2014/0068593 A1* | 3/2014 | McErlane | G06F 8/61 717/171 |
| 2014/0130151 A1* | 5/2014 | Krishnamurthy | G06F 21/572 726/22 |
| 2014/0214655 A1* | 7/2014 | Smith | G06Q 20/10 705/39 |
| 2014/0244409 A1* | 8/2014 | Nathanel | G06Q 50/12 705/15 |
| 2014/0254575 A1* | 9/2014 | Venkatraman | H04W 48/16 370/338 |
| 2015/0058211 A1* | 2/2015 | Thomson | G06Q 20/3223 705/40 |
| 2015/0073996 A1* | 3/2015 | Makhotin | G06Q 20/02 705/71 |
| 2015/0154624 A1* | 6/2015 | Torabi | G06Q 30/0214 705/14.16 |
| 2015/0242874 A1* | 8/2015 | Voigt | G06Q 30/0214 705/14.16 |
| 2016/0234625 A1* | 8/2016 | Wang | H04W 4/001 |
| 2016/0241675 A1* | 8/2016 | Feng | H04L 67/34 |

OTHER PUBLICATIONS

N. Tsarmpopoulos et al., "A Low-Cost and Simple-to-Deploy Peer-to-Peer Wireless Network based on Open Source Linux Routers", [Online], 2005, pp. 1-6, [Retrieved from Internet on Sep. 25, 2017], <http://ieeexplore.ieee.org/stamp/stamp.jsp?arnumber=1386184>.*

Imre Kelényi et al., "Energy-efficient Mobile BitTorrent with Broadband Router Hosted Proxies", [Online], 2010, pp. 1-6, [Retrieved from Internet on Sep. 25, 2017], <http://ieeexplore.ieee.org/stamp/stamp.jsp?arnumber=5678757>>.*

* cited by examiner

VIRAL DISTRIBUTION OF MOBILE APPLICATION SOFTWARE

FIELD

The subject matter described herein relates to wireless communications.

BACKGROUND

In the mobile payment ecosystem, and particularly in high-growth markets, there is a need to update and modify a consumer's, agent's, or merchant's set of features frequently. Similar needs are met in other areas of business such as insurance or rental related services.

The need arises from the fact that in growth markets services such as financial or insurance services are nascent and new features and updates are introduced with high frequency. At growth market, end-users also frequently elevate from one consumer category to another and gain access to new services. For example, end-users may initially use a mobile payment service without providing any legal documents (if permitted by applicable regulations) to initially use closed-loop products before executing a proper know-your-customer process and gain access to semi-closed or open loop services, where features might be broader.

As a consequence, companies aiming at providing services such as financial, insurance, or rental services through mobile applications in high-growth markets and in a context of limited connectivity may face the challenge of updating and modifying the set of features available on their mobile service applications.

SUMMARY

Methods and apparatus, including computer program products, are viral distribution of a mobile application.

In one aspect there is provided a method. The method may include storing, at a first user equipment, a mobile payment application installation package; sending, by the first user equipment via a short-range radio link, an invitation to a second user equipment, the invitation representing an offer to receive the mobile payment application installation package; receiving, at the first user equipment, a response to the invitation; and sending, by the first user equipment via the short-range radio link, the mobile payment application installation package, when the response to the invitation represents an acceptance of the offer.

In some variations, one or more of the featured disclosed herein including one or more of the following features can optionally be included in any feasible combination. The mobile payment application installation package may be stored, as part of an installation of the mobile payment application installation package at the first user equipment, in a secure folder visible to the mobile payment application installation package. The mobile payment application installation package may include one or more identities of one or more user equipment and/or users that shared the mobile payment application installation package. The mobile payment application installation package may further include a configuration file of features for a mobile payment application and an identifier of the version of the mobile payment application installation package. The short-range radio link may include at least one of a Bluetooth link, a WiFi link, or an NFC link. The first user equipment may generate a user interface to enable the sharing of the mobile payment application installation package, wherein a selection of an element of the user interface triggers the sending of the invitation. The mobile payment application installation package may provide a mobile payment service. The method may further include coupling to a configuration server to provide one or more identities of one or more user equipment and/or users that shared the mobile payment application installation package and receiving, in response to the provided one or more identities, an indication of a reward. The first user equipment may receive the mobile payment application installation package from at least one of a configuration server or another user equipment coupled to the first user equipment via another short-range radio link.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
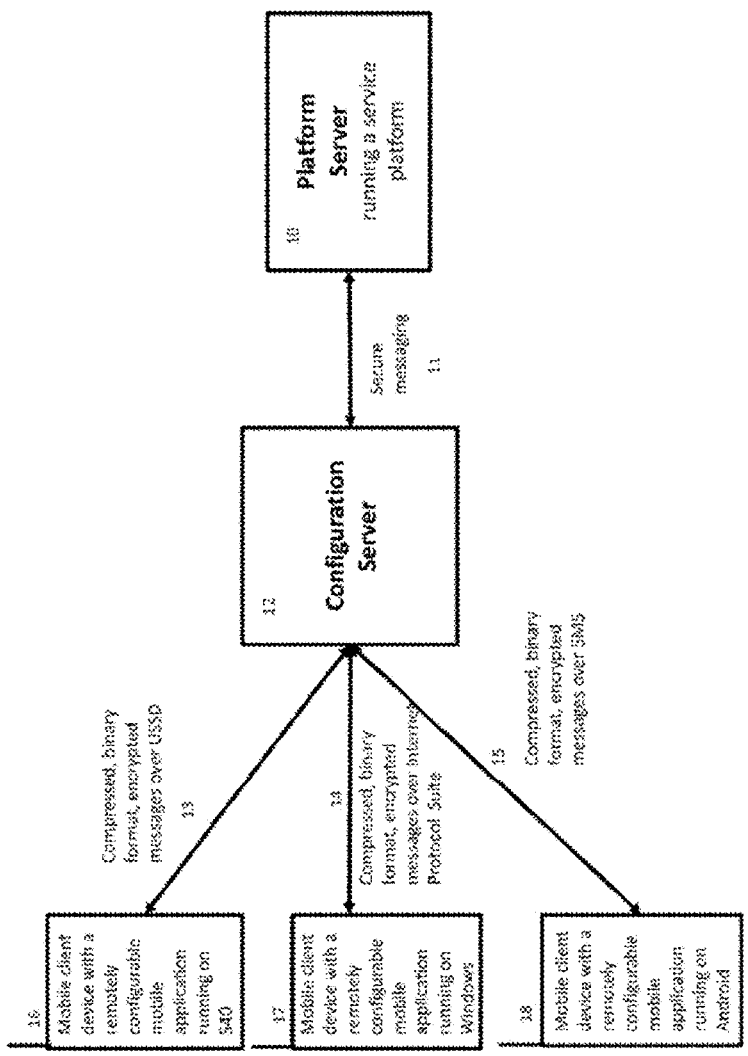
FIG. 1 depicts an example of a process for remotely configuring a mobile application, in accordance with some example embodiments.

Like labels are used to refer to same or similar items in the drawings.

DETAILED DESCRIPTION

FIG. 1 depicts an example of a system 100 including a first server, such as platform server 10 providing a service. The first server may be coupled securely 11 to a second server, such as configuration server 12, which may be used to provide, configure, and/or update a mobile application at user equipment 16, 17, and/or 18. For example, the mobile application may provide access to the service, and may be remotely configurable and/or provided by configuration server 12.

The user equipment 16-18 may each include the remotely configurable mobile application operating on a mobile operating system (OS), such as Android, Windows Mobile, iPhone OS, and the like, although any other operating system may be used as well. The configuration of this mobile application may be created and managed by the configuration server 12, as noted. The configuration server 12 and one or more user equipment 16-18 may communicate via wireless links 13-15 carrying for example a limited, narrow communication channel, such as Short Message Service (SMS), an Unstructured Supplementary Service Data (USSD), and/or an Internet Protocol Suite (IP Suite), as well as other types of links or channels.

Moreover, the information carried by links 13-15 may be compressed, in a binary format, and/or encrypted. Moreover, management messages may be compressed, in binary format, and/or encrypted and sent via links 13-15. The management message may relate to the providing, configuring, and/or updating of the mobile application. The platform server 10 may provide a service, such as mobile payment service, which can be provided via the remotely configurable mobile applications at user equipment 16-18, although services other than mobile payment may be provided as well. In the case of the mobile payment service, user equipment 16-18 may each include a mobile payment application that can be used to make payments via the a mobile payment service at platform server 10. The mobile payment application may also allow replenishment of a mobile payment account, viewing account balances, and other operations associated with mobile payments.

Figure 2:
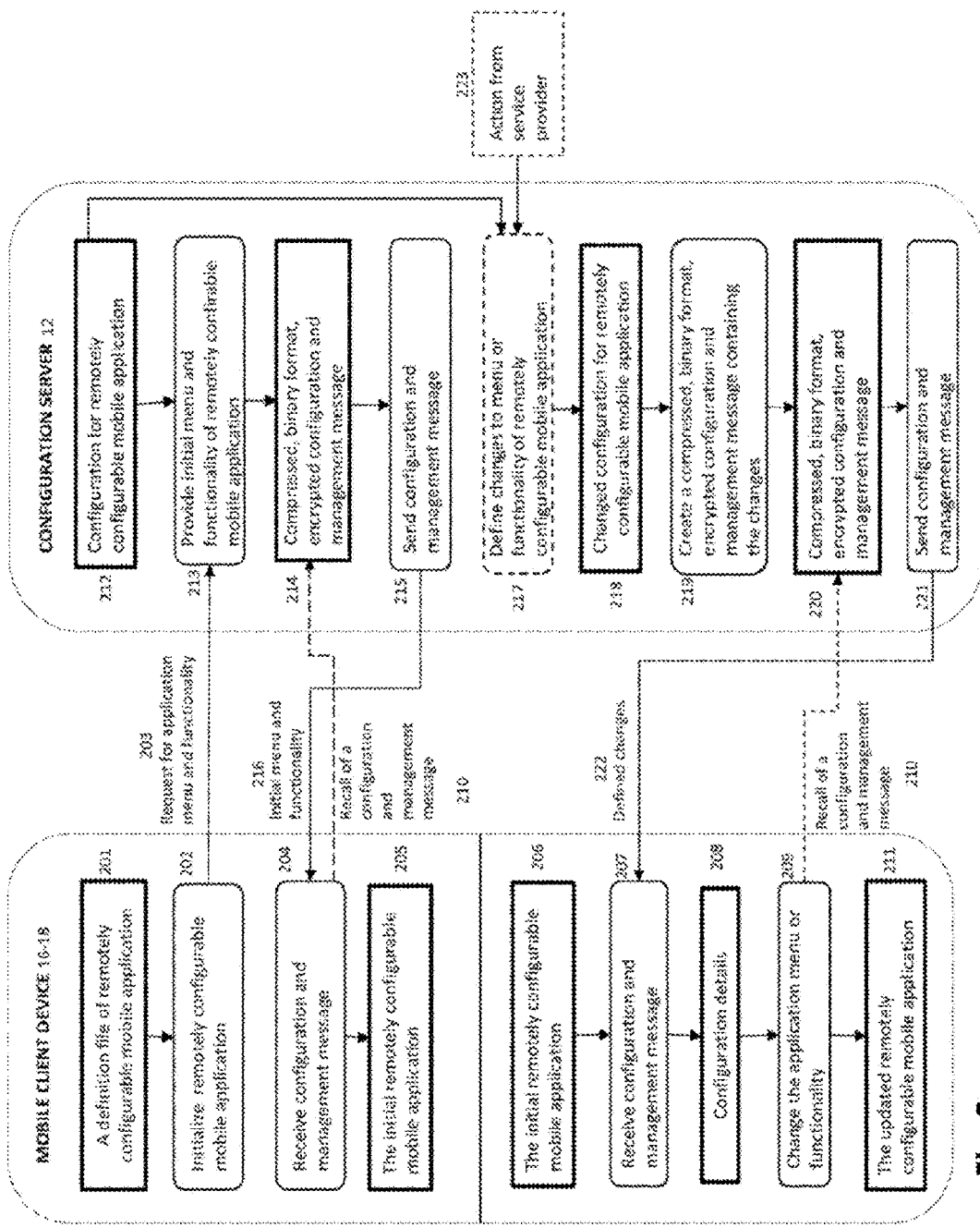
FIG. 2 depicts another example of a process for remotely configuring a mobile application, in accordance with some example embodiments.

FIG. 2 illustrates a process 200 for initialization of a remotely configurable mobile application at user equipment 16-18 and changing for example an aspect of the mobile application, such as the menu and/or other functionality of the remotely configurable mobile application through configuration server 12, in accordance with some example embodiments.

The remotely configurable mobile application at a user equipment may be initialized, at 202, by installing for example a definition file 201 for the mobile application, which then after installation enables requesting the menu and functionality for the application 203 from the configuration server holding the configuration of the application 212 according to a service that the application is matched with and provides the initial menu, related data types and functionality 213 in one or more compressed, binary format configuration and management messages 214. The configuration and management message 214 may be sent 215-216 to the remotely configurable mobile application in the user equipment and once the message containing the configuration data is received 204, the initial version of the application is ready to use 205. Changes to the running initial version of the application 206 may be defined and implemented on a configuration server 217-218 while the mobile application is running the user equipment based on the current configuration of the application 212, which is stored in the server 10 and/or 12, and the use of the application may not disturbed while the changes are defined at the configuration server 217. The configuration changes may be triggered at 223 by a service provider via for example platform server 10. The configuration changes 218 may be passed to the user equipment with the remotely configurable mobile application in a compressed and/or binary format configuration via management message 219-222. After the message is received 207, the menu and functionality of the mobile application are ready to be changed 209 according to the received configuration details 208 and the mobile application may thus be ready for use with the updated menu and functionality 211.

FIGS. 1 and 2 depict ways of disseminating a mobile application to user equipment when the user equipment has limited data service. However, in some instances, the data connectivity may be very limited if not non-existent because of limited mobile network availability and/or a user's preference to avoid using data service connections except in certain circumstances (for example, to save data connection charges). Indeed, this limited data connectivity may represent a challenge to service providers seeking adoption of a mobile application. The limited data connection may even be more limited in growth or emerging markets where there is in some respects a greater need to provide mobile services.

The subject matter disclosed herein relates disseminating the mobile application to user equipment virally via short-range links to address for example environments having limited data connectivity either due to limited data service or a user's preference to avoid using data connection except in certain circumstances (for example, to save data connection charges).

In some example embodiments, the subject matter disclosed herein may allow a user equipment, such as user equipment 16, 17, and/or 18, to share an application to other user equipment virally via a so-called short-range data link, such as a Bluetooth link, a Near Field Communications (NFC) link, and/or any other radio technology and/or even a physical memory card copy and transfer.

In some example embodiments, a first user equipment may send via a short-range link an install package including a mobile application and a corresponding install file to a second user equipment. When the install package is received via the short-range link, the second user equipment may install the mobile application. The second user equipment may send via a short-range link an install package including a mobile application and a corresponding install file to a third user equipment, which may install the mobile application as well. In this way, the mobile application may be virally disseminated without a data connection to configuration server 12. When the user equipment that received the mobile application virally, such as the above noted second and third user equipment, has access to a data connection to server 12, configuration server 12 may manage, update, and/or configure the mobile application as noted above with respect to process 200. For example, server 12 may check if the configuration is up to date or not (for example, based on a timestamp). If there have been changes to the configuration, then an update (for example, the changes) may be sent to the user equipment. The user equipment may then update a configuration file, which may be reflected on subsequent viral distributions made by the user equipment to other devices.

In some example embodiments, the install package may be wrapped or include information regarding the identity of one or more user equipment that provided (or shared) the mobile application to other user equipment. For example, the install package may identity the user of the first user equipment and/or the first user equipment. This information may be used by server 10 and/or 12 for tracking purposes as well as other purposes, such as a reward to the first user equipment. Specifically, the reward may be an incentive, such as a cash reward, loyalty points, and the like. The identity information may also be used for data analysis to determine the success of certain distribution channels and/or to create analytics (for example, heat maps of application distribution including location and/or time information associated with the dissemination). This may allow platform server 10 and/or configuration server 12 to analyze the mobile application distribution network and spread speed, and hence create an estimate of the total number of activated devices on market at certain time period.

Figure 3:
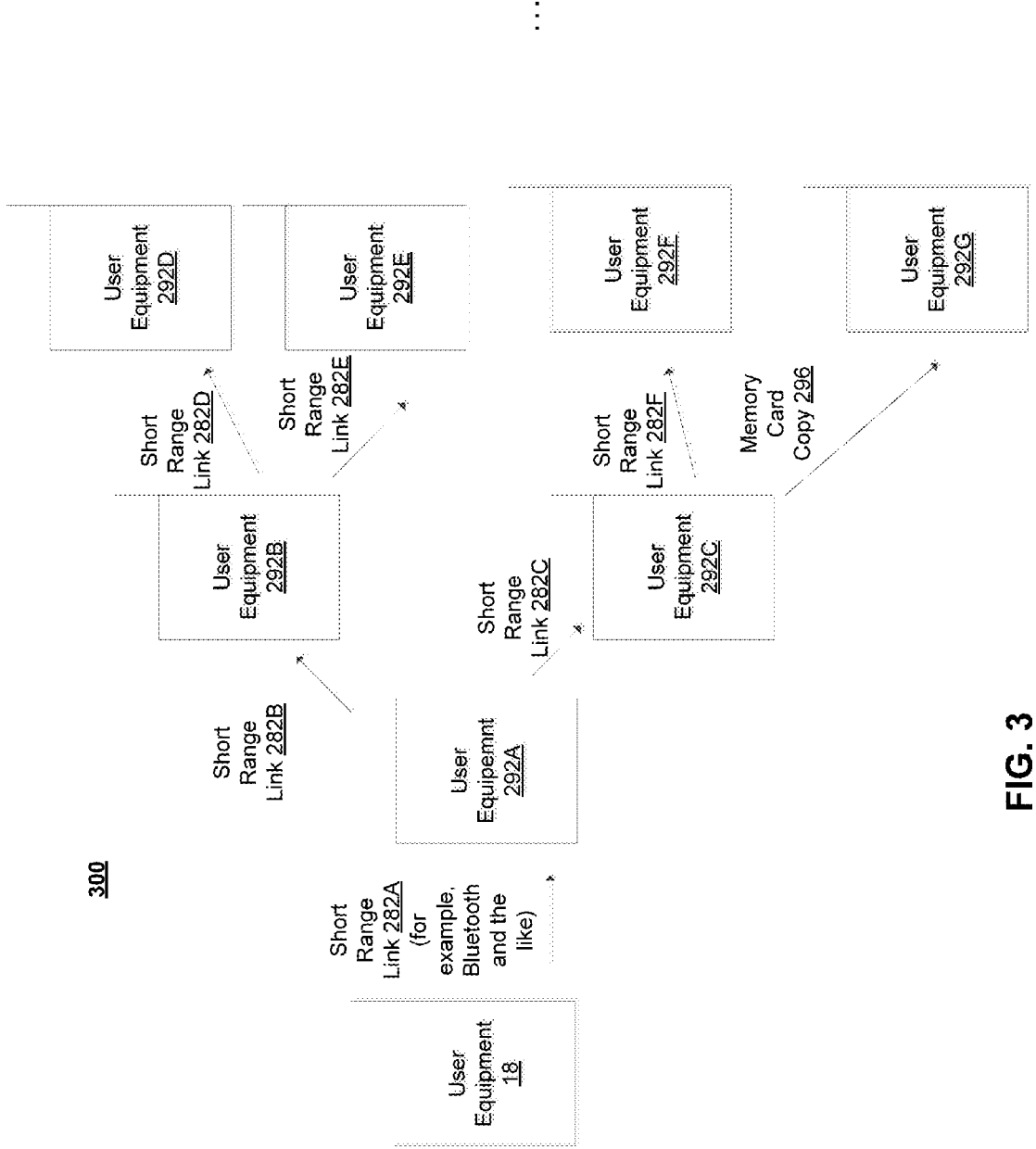
FIG. 3 depicts an example of a system for disseminating a mobile application among user equipment, in accordance with some example embodiments.

FIG. 3 depicts a system 300 including a plurality of user equipment including user equipment 18 having a mobile application received from configuration server 12.

The user equipment 18 may include a mobile application configured to, after installation at the user equipment 18, to find its own installable package (which may be stored in a device folder as well as other locations including configuration server 12) and copy the installation package to a location where the installation package may be further distributed to other user equipment, such as user equipment 292A. To enable viral distribution, each shared mobile application may be configured to allow a user equipment to, after installation, find its own installable mobile application package from device folders at the user equipment and copy the mobile application installation package to a location at the user equipment for further distribution to other user equipment. For example, the mobile application installation package may include logic to find a setup package, which will be then used for distribution purpose alongside a configuration file. This logic for finding the setup package and copying it to private folder may occur when the application is initially started. This may ensure that the distribution process will proceed, even if a user deletes the mobile application installation package (for example, by clearing a download folder and the like), since the setup package has been copied to a private folder (which may be unseen by the user and/or other applications and thus secure. In this context, the folder is a secure folder in the sense that access is restricted to the domain of the application itself, so the secure folder may not invisible and inaccessible to a typical end-user and/or other applications (but accessible by certain applications, such as the virally distributed mobile application disclosed herein).

In the example of FIG. 3, user equipment 18 may send via a short-range link 282A a notification to user equipment 292A. The notification message may offer the mobile application installation package to user equipment 292A. In response, user equipment 292A may send via a short-range link 282A a response indicating interest in receiving the mobile application installation package. When this is the case, user equipment 18 may send the mobile application installation package to user equipment 292A. User equipment 292A may then install the mobile application and, after installation, find its own installable package (which may be stored in a device folder at user equipment 292A) and copy the installation package to a location where the installation package may be further distributed to other user equipment, such equipment 292B-C via short-range links 282B-C. User equipment 292B may, after installation, then provide a copy of the install package to user equipment 292D-E via short-range links 282D-E, while user equipment 292C may provide the installation package to user equipment via short range link 282F and via a removable memory card copy 296 to user equipment 292G. This process of distributing the mobile application installation package may continue to additional user equipment as well.

In some example embodiments, the configuration server 12 may update one or more of the user equipment with a more current version of the mobile application install package. To illustrate further, a setup file (which may include for example, an installation package, in form of .apk, JAR and JAD that are relatively static) may not change while going through the viral distribution process. In the case of user equipment 292G for example, it may include the exact same installation file as user equipment 292A. But the configuration file may, however, be different at other user equipment as each user equipment may be able to update its configuration file and keep the configuration file up to date when connectivity to configuration server becomes available. In some example embodiments, the mobile application install package may include an indicator, such as a timestamp, revision number, and/or the like, to indicate the version of the mobile application install package.

Figure 4:
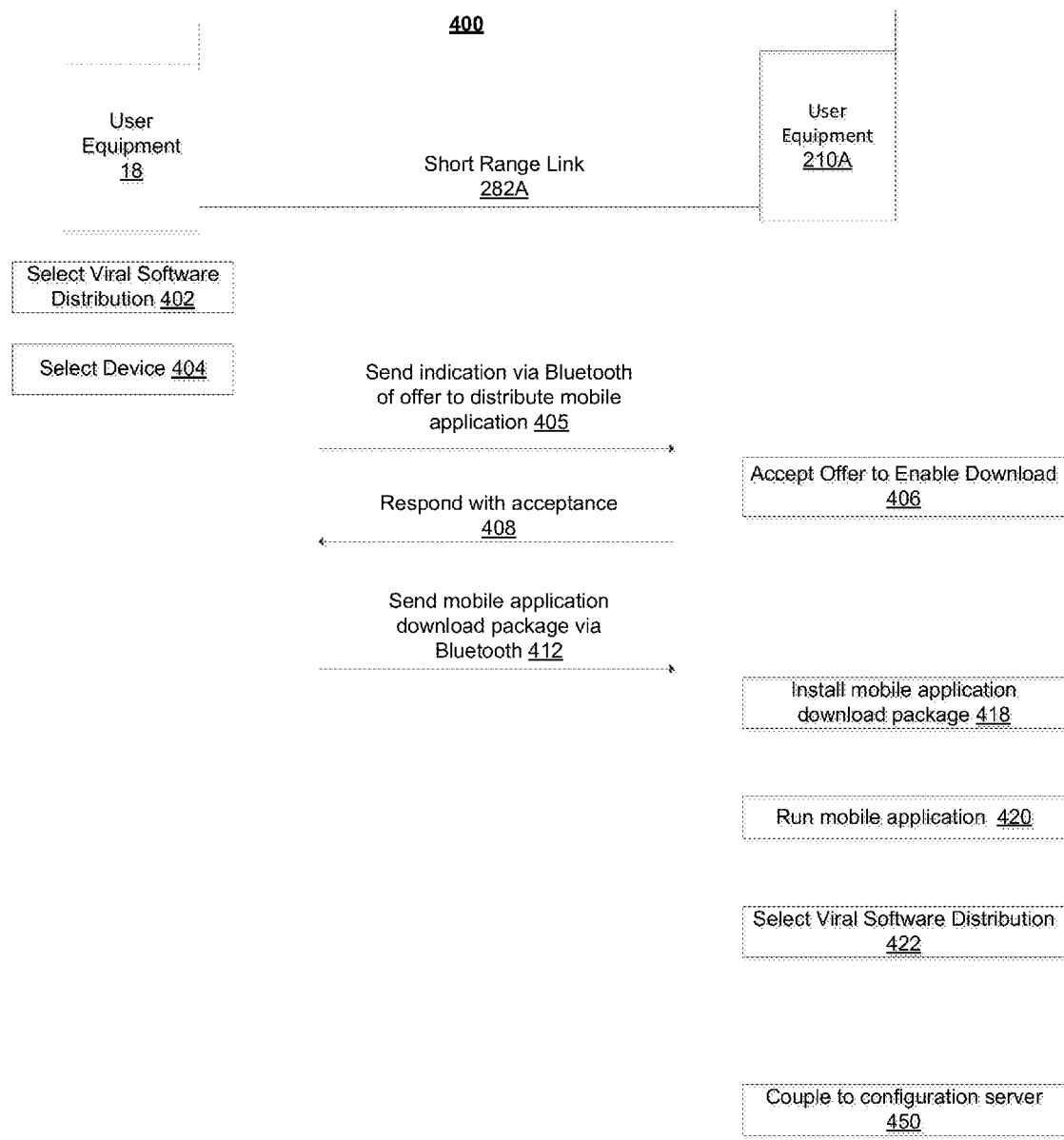
FIG. 4 depicts a process for disseminating a mobile application among user equipment, in accordance with some example embodiments.

FIG. 4 depicts a process 400 for distribution of a mobile application, in accordance with some example embodiments. The description of FIG. 4 also refers to FIGS. 1, 2, 3, and 5A-D.

User equipment 18 may include a mobile application, such as a mobile application for a mobile payment service, and this mobile application may be provided by configuration service 12 in accordance with process 200, although the mobile application and its install package may be provided to user equipment 18 in other ways as well.

Figure 5A:
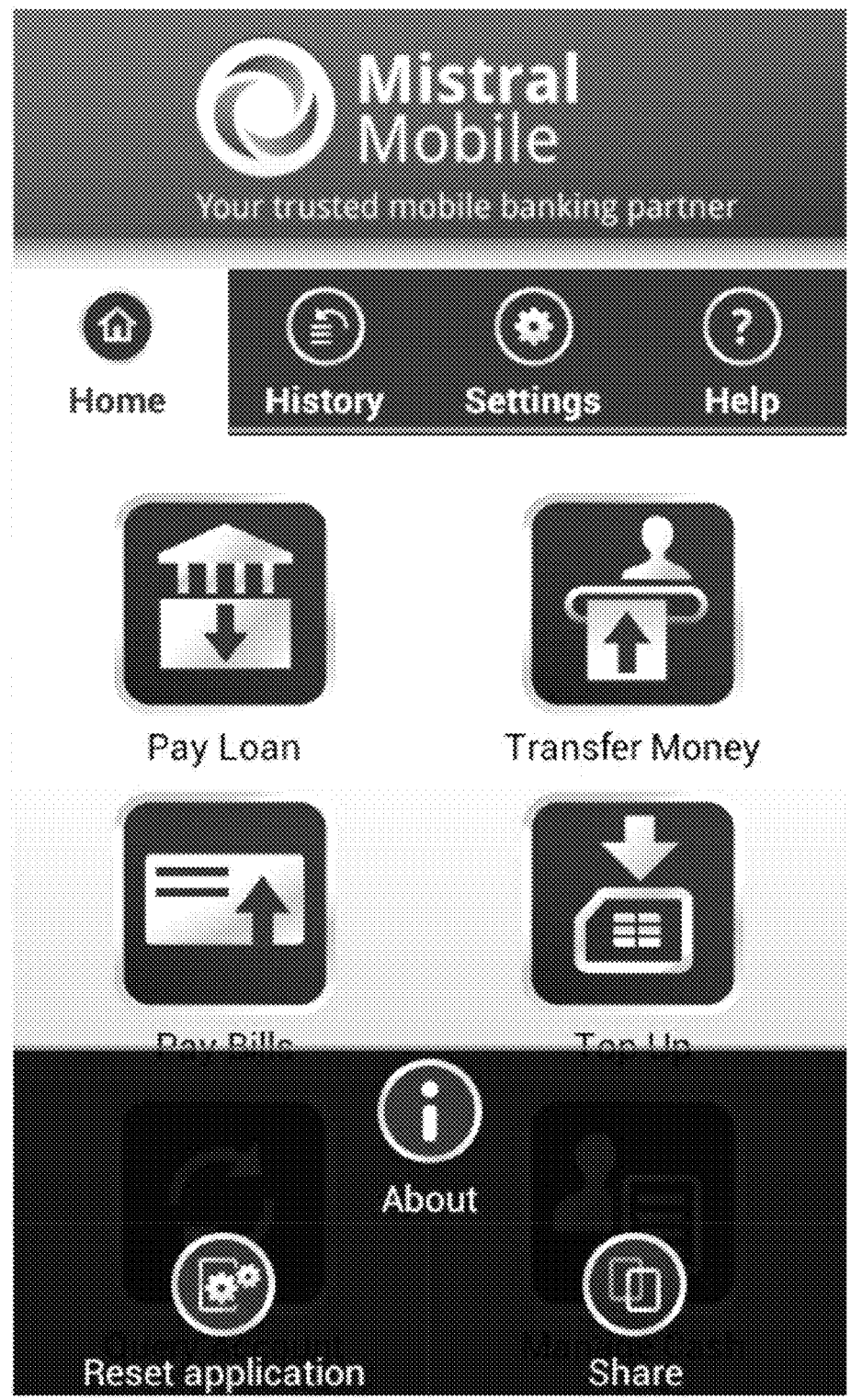
FIGS. 5A-D depict examples of user interfaces, in accordance with some example embodiments.
Figure 5B:
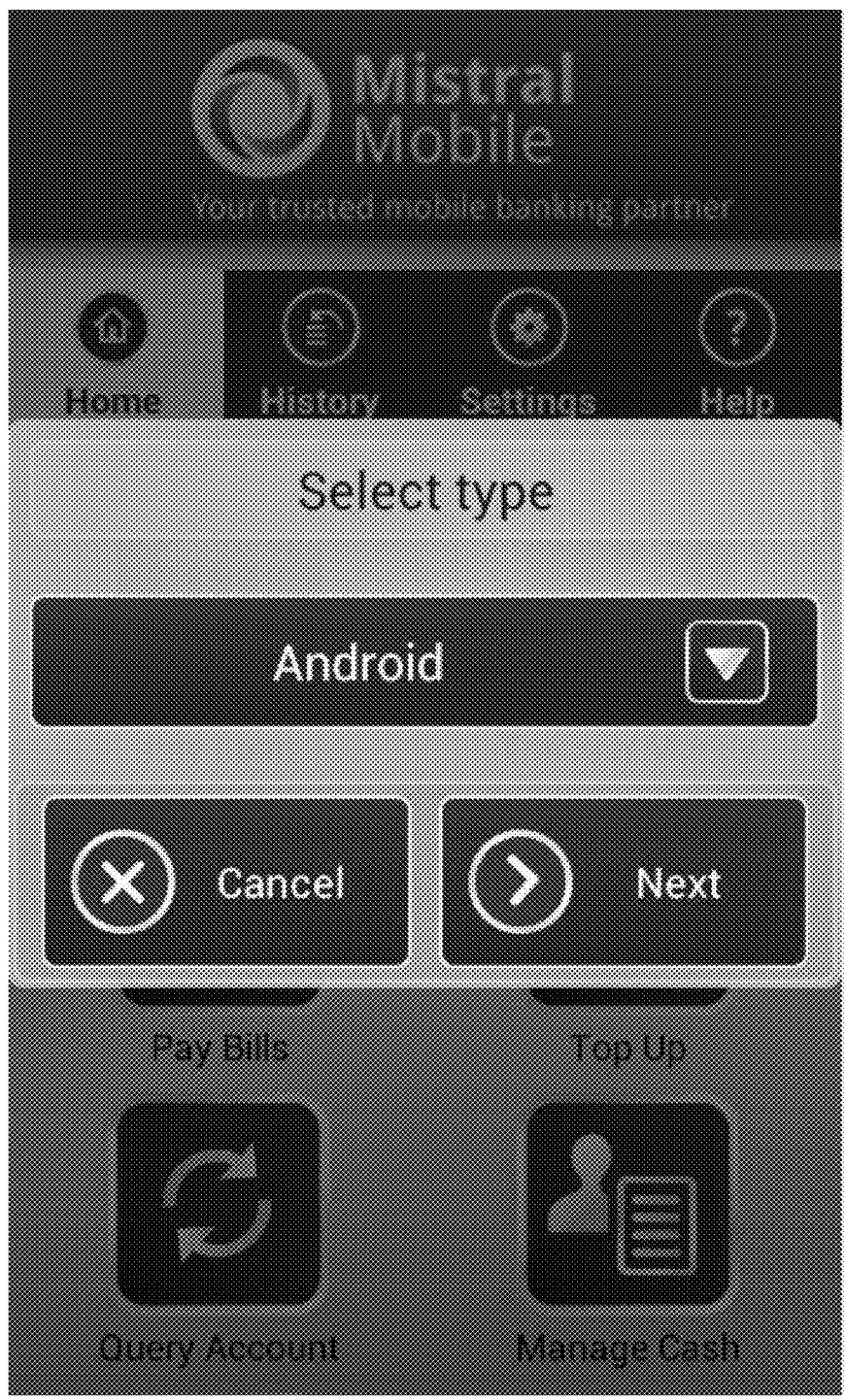

At 402, user equipment 18 may present a user interface to allow a selection indicative of disseminating the mobile application (which may include the install package for the mobile application as well) to another device, such as user equipment 292A, via a short-range link 282A, such as a Bluetooth link. At 404, user equipment 18 may also allow one or more devices, such as user equipment 292A, to be selected as a recipient of the mobile application. For example, a user interface may be provided at user equipment 18, and this user interface may allow a selection of one or more devices, such as user equipment 292A. FIG. 5A depicts an example user interface presented at a user equipment. In this example, when the icon "share" is selected (which indicates a willingness to virally share the mobile application), the user interface at FIG. 5B may be presented. At FIG. 5B, the operating system type for the distribution may be selected.

Referring again to FIG. 4, the selection at 402 and 404 may, in some example embodiments, initiate user equipment 18 to establish a short-range connection for example via a short-range link 282A to the selected device, which in this example is user equipment 292A. However, the short-range connection, such as link 282A, to a selected device may be established at other times including before 402 and 404 as well. Moreover, the selection at 402 and 404 may also trigger user equipment 18 to send, at 405, an indication to user equipment 292A, and this indication may represent offer to provide the mobile application to user equipment 292A.

Figure 5C:
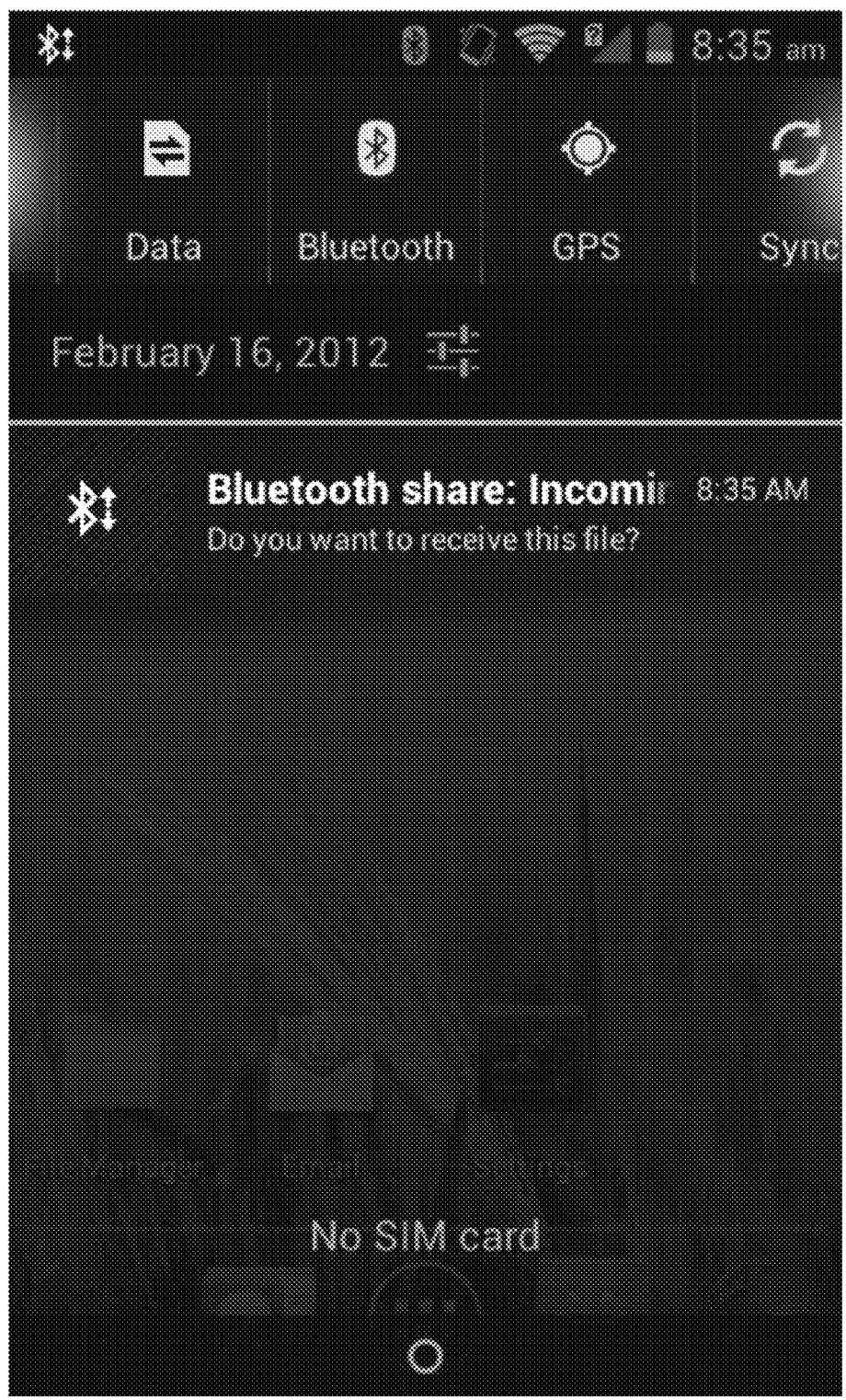
Figure 5D:
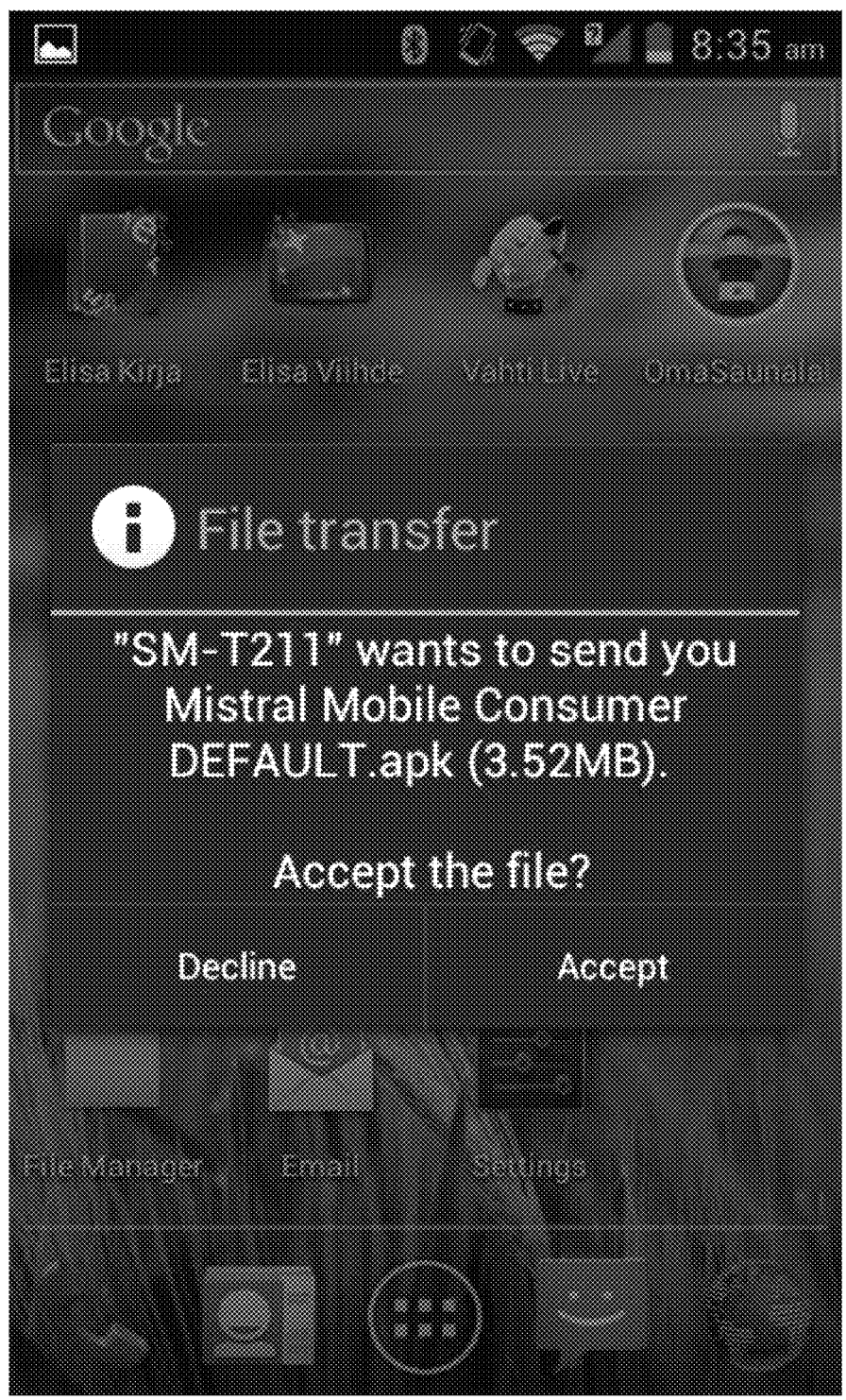

At 406, user equipment 292A may accept or reject the offer request 405 (and/or a connection request for the short-range link if the connection has not already been established). For example, a notification may appear at user equipment 292A, and this notification may at 406 allow a selection or a rejection of the offer. FIG. 5C depicts an example of the notification message. Referring again to FIG. 4, when accepted, user equipment 292A may send a response, at 408, indicating the acceptance to user equipment 18. FIG. 5D depicts an example of the acceptance user interface presented at user equipment 292A.

Referring again to FIG. 4, in response to receiving the acceptance, user equipment 18 may retrieve the installation package for the mobile application and send, at 412, the mobile application installation package to user equipment 292A. The installation package may also indicate the identity (or an identifier) representative of user equipment 18. The installation package sent at 412 may be a complete package including a core (or seed) part of application, identity information of person that shared application, and a configuration file of features which may create a complete mobile application. If the configuration file is not included, the feature configurations will be collected from the configuration server 12 as noted above with respect to process 200.

User equipment 18 may determine the most recent configuration files to send at 412 and included those files that will be used for distribution. In the case of the Android operating system, the application package sent at 412 may include JAVA application package that can be distributed to user equipment/users that have a mobile information device profile. Moreover, as noted, each package sent at 405 may have a relatively unique identifier of the distributor (which in this example is user equipment 18 or a user thereof), and this identifier may be known by the service at platform server 10 and/or configuration server 12.

At 418, user equipment 292A may install the mobile application and run, at 420, the mobile application. The user equipment 292A may also store an install package for the mobile application. The user equipment 292A may store the mobile application install package in a secure location, as noted, and the storage may comprise a memory, a removable memory, and/or in any other type of storage. The stored installation package may thus be accessed for a subsequent distribution to other devices (for example, user equipment 292A-G and the like) selected at 422.

When the user equipment 292A couples at 450 to a data connection, the mobile application at user equipment 292A may contact (or couple) to configuration server 12. When this is the case, user equipment 292 may be remotely configurable by configuration server 12. Moreover, the configuration server may verify mobile application feature set, and if this feature set is not up to date, the configuration server may update the features over the air.

Although the previous example described with respect to process 400 refers to the use of a short-range link, the install package for the mobile application may be disseminated virally in other ways. For example, the installation package at user equipment 18 may be stored rather than deleted after installation in a folder in a removable storage medium. When this is the case, the removable storage medium may be transferred to user equipment 292A to disseminate the mobile application.

In some example embodiments, the installation package may include script/code to allow installation of the mobile application, the mobile application, and metadata describing the one or more user equipment that may have shared the installation package. For example, user equipment 292G may receive an installation package including the identities (for example, mobile subscriber identities and/or any other indicator) of user equipment 18, 292A, and 292C). Once user equipment 292G couples to configuration server 12 to activate the service provided via the installed mobile application, this identity information may be provided to the configuration server 12. Moreover, the metadata including identity information may enable data analysis to determine the success of certain distribution channels, creation of analytics (for example, heat maps of application distribution including location and/or time information associated with the dissemination). This metadata may allow platform server 10 and/or configuration server 12 to analyze the mobile application distribution network, spread speed, and/or create an estimate of the total number of activated devices at a market at a certain time period.

Moreover, configuration server 12 may provide an installation package for the mobile application with one or more conditions and/or limitations. For example, the ability to share without accessing the server 12 may be limited by time (for example, disseminate until a certain time), after which dissemination may be disabled. Alternatively or additionally, the ability to share without accessing the server 12 may be limited by number of shares (for example, a certain quantity of copy and shares of the installation package).

As noted, if a user equipment does not receive an updated (or latest version) of a configuration file as part of proximity sharing disclosed herein, the configuration server may update the missing part of the features. Those features may be categorized into mandatory features and optional updates.

The virally distributed package may also support other platforms. For example, a platform may contain application packages of other platforms as well. To illustrate further, an Android application may act as a distributor to a user equipment having a different operating system, such as Java. As such, even if a user has an Android-based device, the user may virally distribute applications to other phone types, such as the Java phone as well as other types of operating systems.

Figure 6:
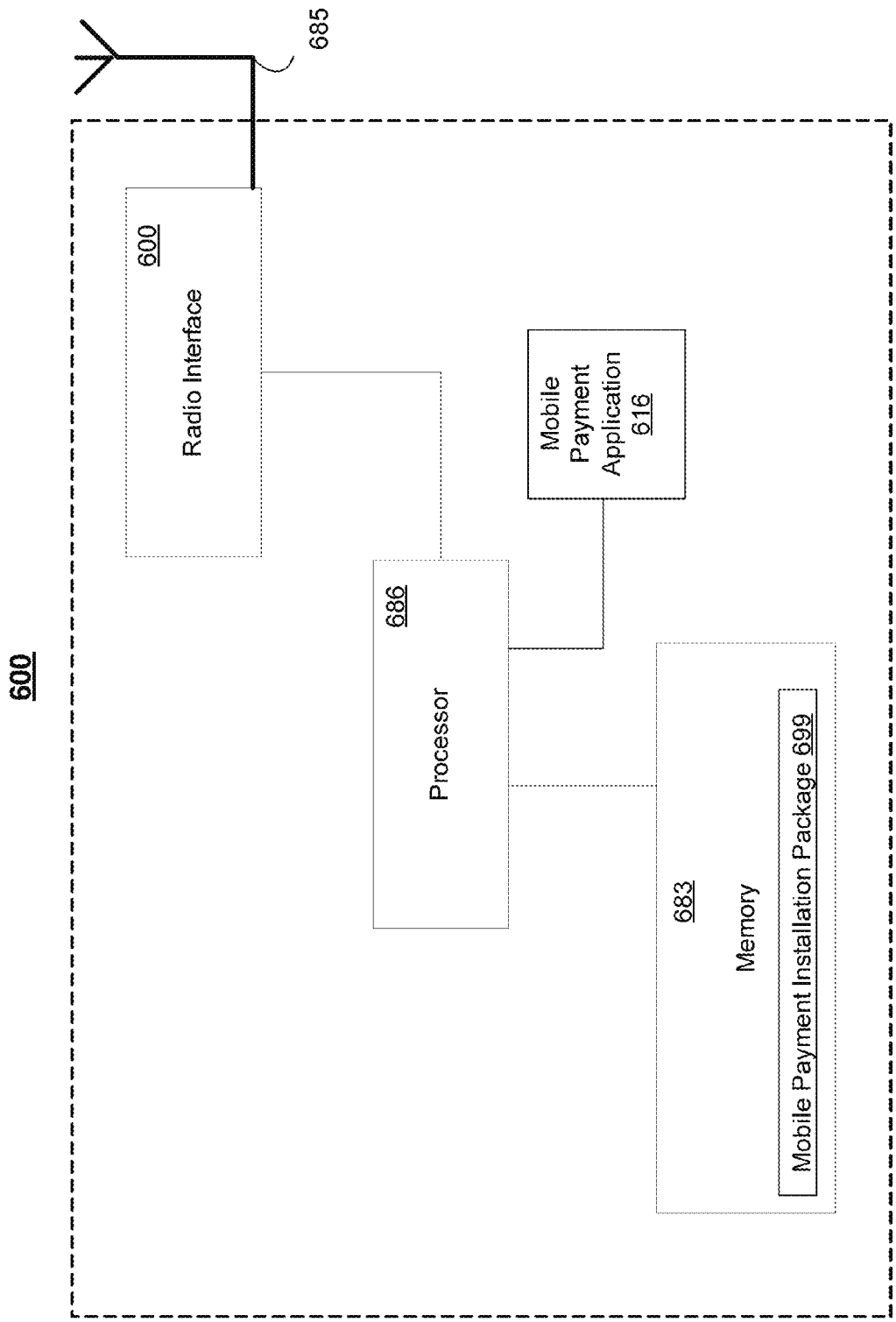
FIG. 6 depicts an example of a user equipment, in accordance with some example embodiments.

FIG. 6 depicts an example implementation of a user equipment 600, in accordance with some example embodiments. The user equipment 600 may include a mobile payment application 616 which provides via platform server 10 a mobile payment service, as well as other types of applications. The user equipment 600 may also store a mobile payment installation package 699 (as well as other types of install packages) for dissemination to other user equipment.

The user equipment 600 may be implemented as any processor-based device including a cell phone, smart phone, tablet, and the like. The user equipment 600 may include one or more antennas 685 configured to transmit and/or receive via links to a wireless access point and/or base station via for example an access network, although user equipment 600 may have or include wired connections as well. The user equipment 600 may include or be coupled to other servers, such as configuration server 12, platform server 10, and/or other networks, nodes, and the like. The user equipment 600 may further include a plurality of radio interfaces 687 coupled to the antenna 685. The radio interfaces may correspond to one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as 802.11 WiFi and the like, 1G, 2G, 3G, 4G, WiBro, Bluetooth, Bluetooth low energy (BT-LE), near field communications (NFC), and any other radio access technologies. The radio interface 687 may further include other components, such as filters, converters (for example, digital-to-analog converters and the like), mappers, a Fast Fourier Transform (FFT) module, and the like, to generate symbols for a transmission via one or more downlinks and to receive. The user equipment 600 may further include one or more processors, such as processor 686 for controlling the user equipment 600 and for accessing and executing program code stored in at least one memory 683. The at least one memory may include a removable memory card as well in some example embodiments. The memory 683 may store code for the mobile application 616 and the mobile payment installation package 499, in accordance with some example embodiments. The memory 683 may also include code which when executed provides one or more aspects of process 200 and/or 400.

In some example implementations, the subject matter disclosed herein may provide enhanced dissemination of a mobile application.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, some of the examples described herein refer to example values for key part collections, key parts, keys, messages, and the like, but these are only illustrative as other values may be used as well. Furthermore, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:
1. A method comprising:
storing, at a first user equipment, a mobile payment application installation package;
sending, by the first user equipment via a short-range radio link, an invitation to a second user equipment, wherein the invitation represents an offer for the first user equipment to share the mobile payment application installation package with the second user equipment;
receiving, at the first user equipment, a response to the invitation from the second user equipment; and
sending, by the first user equipment, the mobile payment application installation package to the second user equipment, based at least on the response to the invitation indicating that the second user equipment accepts the offer, wherein the sending is performed via the short range radio link, wherein the mobile payment application installation package is executed to at least:
install, at the second user equipment, a copy of the mobile payment application installation package and a copy of the mobile payment application, wherein executing the mobile payment application performs one or more mobile payment operations,
update, by at least coupling to a configuration server via a long-range communication channel, the copy of the mobile payment application to conform to a configuration of the second user equipment, and
update, by at least coupling to the configuration server via the long-range communication channel, the copy of the mobile payment application installation package, wherein executing the updated copy of the mobile payment application installation package locates a setup package and stores the setup package in an access-restricted location at the second user equipment, and wherein executing the setup package triggers a viral distribution of the updated copy of the mobile payment application package to at least a third user equipment.

2. The method of claim 1, wherein the mobile payment application installation package is stored, as part of an installation of the mobile payment application installation package at the first user equipment, in a secure folder visible to the mobile payment application installation package.

3. The method of claim 1, wherein the mobile payment application installation package includes one or more identities of one or more user equipment and/or users that shared the mobile payment application installation package.

4. The method of claim 3, wherein the mobile payment application installation package further includes a configuration file of features for a mobile payment application and an identifier of the version of the mobile payment application installation package.

5. The method of claim 1, wherein the short-range radio link comprises at least one of a Bluetooth link, a WiFi link, or an NFC link.

6. The method of claim 1 further comprising:
generating, by the first user equipment, a user interface to enable the sharing of the mobile payment application installation package, wherein a selection of an element of the user interface triggers the sending of the invitation.

7. The method of claim 1, wherein the mobile payment application installation package provide a mobile payment service.

8. The method of claim 1 further comprising:
coupling to a configuration server to provide an identity of the first user equipment as having shared the mobile payment application installation package; and
receiving, in response to providing the identity of the first user equipment, an indication of a reward for sharing the mobile payment application installation package.

9. The method of claim 1, wherein the first user equipment receives the mobile payment application installation package from at least one of a configuration server or another user equipment coupled to the first user equipment via another short-range radio link.

10. The method of claim 1, wherein executing the mobile payment application installation package further updates the copy of the mobile payment application and the copy of the mobile payment application installation package, in response to the long-range communication channel being available.

11. An apparatus comprising:
at least one central processing unit including computer program code which when executed by the at least one processor circuitry at least:
store, at the apparatus, a mobile payment application installation package;
send, by the apparatus via a short-range radio link, an invitation to another apparatus, wherein the invitation represents an offer for the apparatus to share the mobile payment application installation package with the other apparatus;

receive, at the apparatus, a response to the invitation from the other apparatus; and send, by the apparatus, the mobile payment application installation package to the second user equipment, based at least on the response to the invitation indicating that the second user equipment accepts the offer, wherein the sending is performed via the short range radio link, wherein the mobile payment application installation package is executed to at least:

install, at the other apparatus, a copy of the mobile payment application installation package and a copy of the mobile payment application, wherein executing the mobile payment application performs one or more mobile payment operations, update, by at least coupling to a configuration server via a long-range communication channel, the copy of the mobile payment application to conform to a configuration of the other apparatus, and update, by at least coupling to the configuration server via the long-range communication channel, the copy of the mobile payment application installation package, wherein executing the updated copy of the mobile payment installation package locates a setup package and stores the setup package in an access-restricted location at the second user equipment, and wherein executing the setup package triggers a viral distribution of the updated copy of the mobile application package to one or more additional apparatuses.

12. The apparatus of claim 11, wherein the mobile payment application installation package is stored, as part of an installation of the mobile payment application installation package at the apparatus, in a secure folder visible to the mobile payment application installation package.

13. The apparatus of claim 11, wherein the mobile payment application installation package includes one or more identities of one or more user equipment and/or users that shared the mobile payment application installation package.

14. The apparatus of claim 13, wherein the mobile payment application installation package further includes a configuration file of features for a mobile payment application and an identifier of the version of the mobile payment application installation package.

15. The apparatus of claim 11, wherein the short-range radio link comprises at least one of a Bluetooth link, a WiFi link, or an NFC link.

16. The apparatus of claim 11, wherein the at least one processor circuitry at least generates a user interface to enable the sharing of the mobile payment application installation package, wherein a selection of an element of the user interface triggers the sending of the invitation.

17. The apparatus of claim 11, wherein the mobile payment application installation package provide a mobile payment service.

18. The apparatus of claim 11, wherein the at least one processor circuitry at least:

couples to a configuration server to provide an identity of the apparatus as having shared the mobile payment application installation package; and receives, in response to providing the identity of the apparatus, an indication of a reward for sharing the mobile payment application installation package.

19. The apparatus of claim 11, wherein the apparatus receives the mobile payment application installation package from at least one of a configuration server or another user equipment coupled to the apparatus via another short-range radio link.

20. A non-transitory computer-readable storage medium include computer code which when executed provide operations comprising:

storing, at a first user equipment, a mobile payment application installation package;

sending, by the first user equipment via a short-range radio link, an invitation to a second user equipment, wherein the invitation represents an offer for the first user equipment to share the mobile payment application installation package with the second user equipment;

receiving, at the first user equipment, a response to the invitation from the second user equipment; and sending, by the first user equipment, the mobile payment application installation package to the second user equipment, based at least on the response to the invitation indicating that the second user equipment accepts the offer, wherein the sending is performed via the short range radio link, wherein the mobile payment application installation package is executed to at least:

install, at the second user equipment, a copy of the mobile payment application installation package and a copy of the mobile payment application, wherein executing the mobile payment application performs one or more mobile payment operations, update, by at least coupling to a configuration server via a long-range communication channel, the copy of the mobile payment application to conform to a configuration of the second user equipment, and update, by at least coupling to the configuration server via the long-range communication channel, the copy of the mobile payment application installation package, wherein executing the updated copy of the mobile payment application installation package locates a setup package and stores the setup package in an access-restricted location at the second user equipment, and wherein executing the setup package triggers a viral distribution of the updated copy of the mobile payment application package to at least a third user equipment.

* * * * *